US012738591B2

(12) United States Patent
Sasaki

(10) Patent No.: US 12,738,591 B2
(45) Date of Patent: Sep. 15, 2026

(54) VALVE STRUCTURE AND POWER STORAGE DEVICE

(71) Applicant: DAI NIPPON PRINTING CO., LTD., Tokyo (JP)

(72) Inventor: Miho Sasaki, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 733 days.

(21) Appl. No.: 18/016,548

(22) PCT Filed: Jul. 16, 2021

(86) PCT No.: PCT/JP2021/026876

§ 371 (c)(1),
(2) Date: Jan. 17, 2023

(87) PCT Pub. No.: WO2022/014710

PCT Pub. Date: Jan. 20, 2022

(65) Prior Publication Data

US 2023/0282926 A1 Sep. 7, 2023

(30) Foreign Application Priority Data

Jul. 17, 2020 (JP) ................................ 2020-123275

(51) Int. Cl.
*H01M 50/333* (2021.01)
*H01M 50/30* (2021.01)

(52) U.S. Cl.
CPC ................................ *H01M 50/333* (2021.01)

(58) Field of Classification Search
CPC .... H01M 50/533; H01M 50/50; H01M 50/53; H01M 50/214
See application file for complete search history.

(56) References Cited

U.S. PATENT DOCUMENTS

2014/0057141 A1* 2/2014 Mosso .................. H01M 8/188 429/51
2014/0220463 A1* 8/2014 Daniel ............. H01M 8/04425 429/415
2014/0262760 A1 9/2014 Hayes et al.
2016/0036024 A1 2/2016 Choi et al.
2016/0141669 A1 5/2016 Harrer et al.
2017/0025697 A1* 1/2017 Williams .......... H01M 8/04276
(Continued)

FOREIGN PATENT DOCUMENTS

CN 108091955 A 5/2018
JP S51-15212 B1 5/1976
JP 2010-153841 A 7/2010
(Continued)

OTHER PUBLICATIONS

Oct. 24, 2024 Extended Search Report issued in European Patent Application No. 21841374.8.
(Continued)

*Primary Examiner* — Kenneth J Douyette
(74) *Attorney, Agent, or Firm* — Oliff PLC

(57) ABSTRACT

A valve structure includes a passage communicating the inside of a container housing a power storage device element with outside, and a liquid reservoir part located inside the passage and storing a liquid through which gas generated by the power storage device element is permeable.

14 Claims, 7 Drawing Sheets

(56) References Cited

U.S. PATENT DOCUMENTS

| | | | |
|---|---|---|---|
| 2019/0245174 A1 | 8/2019 | You et al. | |

FOREIGN PATENT DOCUMENTS

| | | |
|---|---|---|
| JP | 2016-031934 A | 3/2016 |
| JP | 2017-228496 A | 12/2017 |
| JP | 2020-055587 A | 4/2020 |
| JP | 2020-063059 A | 4/2020 |

OTHER PUBLICATIONS

Oct. 5, 2021 International Search Report issued in International Patent Application No. PCT/JP2021/026876.

Oct. 5, 2021 Written Opinion issued in International Patent Application No. PCT/JP2021/026876.

* cited by examiner

VALVE STRUCTURE AND POWER STORAGE DEVICE

TECHNICAL FIELD

The present invention relates to a valve structure and a power storage device including the same.

BACKGROUND ART

JP 2016-31934A (Patent Literature 1) discloses a battery in which a battery element is housed in a pouch. In the pouch, a valve structure having a check valve is attached to a heat sealed part that is formed around the periphery of the pouch. This check valve is configured to operate when the internal pressure of the pouch increases to a certain level and vent gas.

Also, JP 2010-153841A (Patent Literature 2) discloses a battery housing a battery element in a box-shaped laminated container. In this laminated container, a flange-like heat sealed part that is formed around the periphery of the laminated container has a portion (hereinafter, easy peel part) that peels off more easily than other parts. The easy peel part peels off when the internal pressure of the laminated container increases to a certain level, and gas is vented through a hole formed in the middle of the easy peel part. The easy peel part is a breaker valve that does not return to its original state once peeled off, unlike a check valve such as in Patent Literature 1.

CITATION LIST

Patent Literature

Patent Literature 1: JP 2016-31934
Patent Literature 2: JP 2010-153841

SUMMARY OF INVENTION

Technical Problem

Incidentally, a check valve is a generally a one-way valve and serves to prevent backflow. However, with a battery such as in Patent Literature 1, the battery degrades when the pouch is contaminated with even a small amount of moisture contained in the air, and thus backflow needs be prevented with high degree of accuracy. Thus, it is difficult, in practice, for a check valve that vents gas inside a pouch such as in Patent Literature 1 to completely prevent air from infiltrating into the pouch at a high level such as required for a battery. Therefore, with a battery such as in Patent Literature 1, there is a problem in that the pouch becomes contaminated with moisture contained in the air, causing the battery to degrade.

On the other hand, with a battery such as in Patent Literature 2, once the breaker valve ruptures, air infiltrates into the laminated container via the passage formed by the rupture. Therefore, even in the case where a breaker valve is used such as in Patent Literature 2, there is a problem that the laminated container is contaminated with moisture contained in the air, causing the battery to degrade.

An object of the present invention is to provide a valve structure that is able to keep moisture from infiltrating into a container housing a power storage device element, and a power storage device including with the same.

Solution to Problem

A valve structure according to a first aspect of the present invention includes a passage communicating an inside of a container housing a power storage device element with outside, and a liquid reservoir part located inside the passage and storing a liquid through which gas generated by the power storage device element is permeable.

A valve structure according to a second aspect of the present invention is the valve structure according to the first aspect, whereby the passage may include an opening that discharges the gas to outside the container, and the liquid reservoir part may be located toward the inside of the container, away from the opening.

A valve structure according to a third aspect of the present invention is the valve structure according to the first or second aspect, whereby the valve structure may include a valve outer body inside which the passage is formed, and the valve outer body may include an attachment part configured to be fixed to the container.

A valve structure according to a fourth aspect of the present invention is the valve structure according to the third aspect, whereby the valve outer body may further include a tubular part joined to the attachment part and disposed outside the container, the tubular part may include a curved portion, and the liquid reservoir part may be located in the curved portion.

A valve structure according to a fifth aspect of the present invention is the valve structure according to the third aspect, whereby the valve outer body may further include a tubular part joined to the attachment part and a casing into which the tubular part is inserted, and the liquid reservoir part may be located inside the casing.

A valve structure according to a sixth aspect of the present invention is the valve structure according to the third or fourth aspect, whereby the liquid reservoir part may further include a partitioning member supported by the valve outer body and partitioning a housing space housing the liquid inside the passage.

A valve structure according to a seventh aspect of the present invention is the valve structure according to the sixth aspect, whereby the liquid reservoir part may include a holding member supported by at least one of the valve outer body and the partitioning member and configured to hold the liquid, and a material constituting the holding member may include a porous material.

A valve structure according to an eighth aspect of the present invention is the valve structure according to the third aspect, whereby the valve outer body may further include a nozzle joined to the attachment part and tapered proceeding toward the liquid reservoir part.

A valve structure according to a ninth aspect of the present invention is the valve structure according to any one of the first to eighth aspects, whereby the valve structure may further include a check valve disposed toward an inside of the container relative to the liquid reservoir part, and configured to open when an internal pressure of the container increases due to the gas generated inside the container, and pass the gas toward the outside from nearer the inside of the container.

A valve structure according to a tenth aspect of the present invention is the valve structure according to any one of the first to ninth aspects, whereby a melting point of the liquid may be 0° C. or lower.

A valve structure according to an eleventh aspect of the present invention is the valve structure according to any one of the first to tenth aspects, whereby a boiling point of the liquid may be 150° C. or higher.

A power storage device according to a twelfth aspect of the present invention includes the valve structure according to any one of the first to eleventh aspects, and an internal space demarcated by the container and housing the power storage device element.

A power storage device according to a thirteenth aspect of the present invention is the power storage device according to the twelfth aspect citing the first or second aspect, whereby the container may include a packaging material and a sealed part in which the packaging material is partially fused such that a housing space housing the power storage device element is formed, and the passage may be formed in a portion of the sealed part where the packaging material is not fused.

Advantageous Effects of Invention

According to a valve structure and a power storage device relating to the present invention, it is possible to keep moisture from infiltrating into a container housing a power storage device element.

DESCRIPTION OF EMBODIMENTS

Hereinafter, a valve structure according to one embodiment of the present invention and a power storage device including the same will be described, with reference to the drawings.

1. First Embodiment 1-1. Overall Configuration of Power Storage Device

Figure 1:
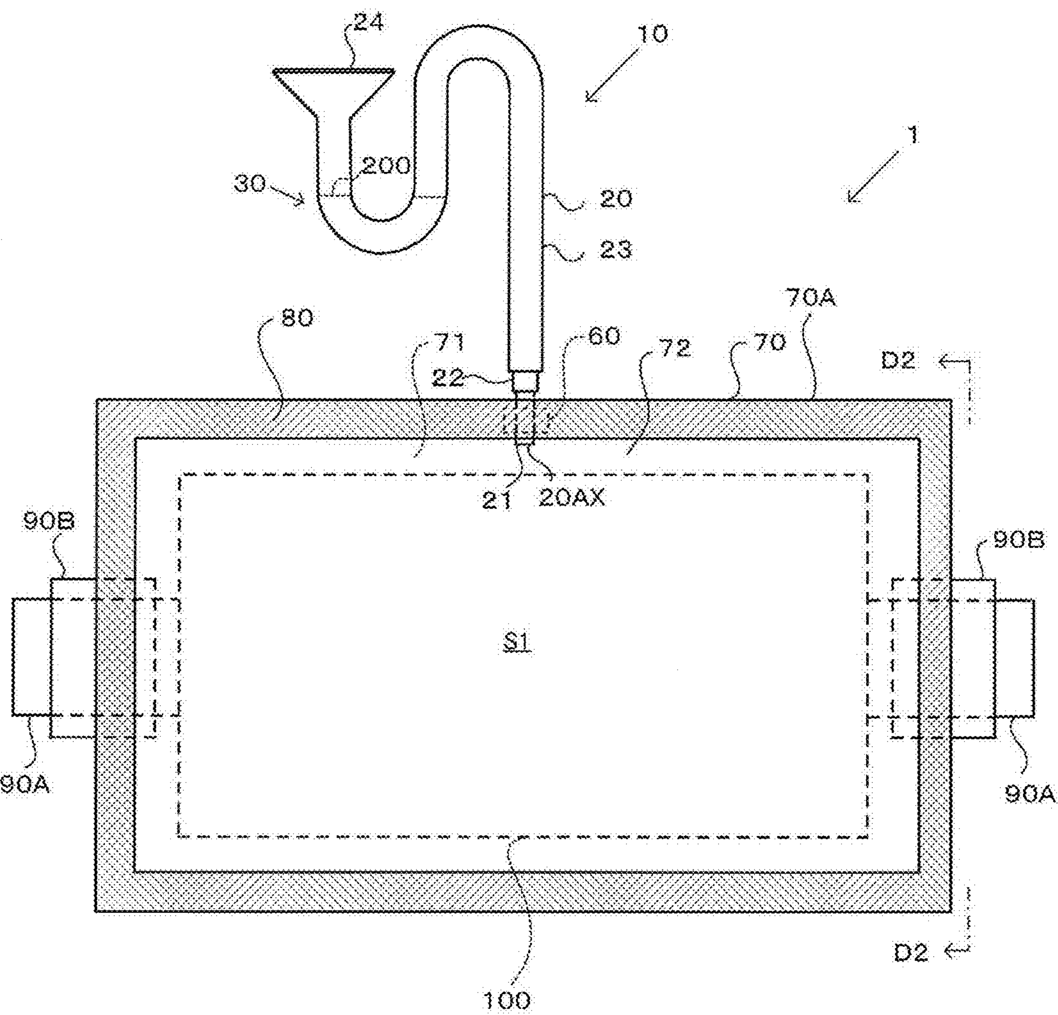
FIG. 1 is a plan view of a power storage device including a valve structure of a first embodiment.
Figure 2:
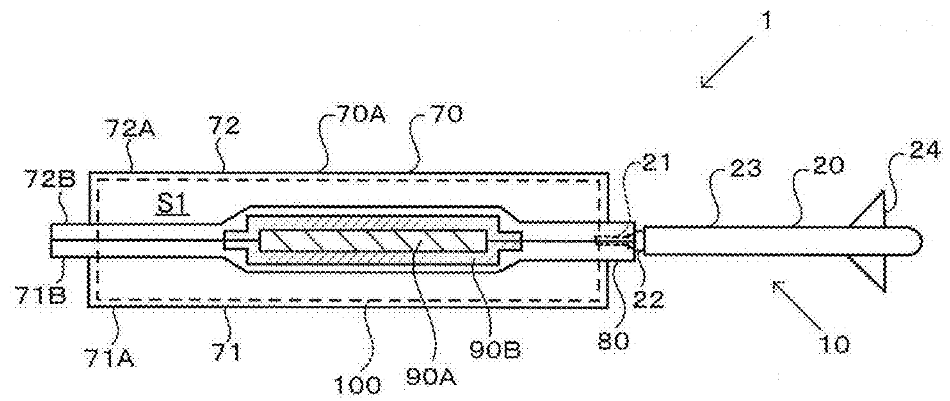
FIG. 2 is a cross-sectional view taken along line D2-D2 in FIG. 1.

FIG. 1 shows a plan view of a power storage device 1 according to the present embodiment. FIG. 2 is a cross-sectional view taken along line D2-D2 in FIG. 1. In these diagrams, parts that are not originally visible from the outside are partially shown with dotted lines for reference purposes. Hereinafter, for convenience of description, the up and down directions and the left and right directions in FIG. 1 will respectively be referred to as “front and back” and “left and right”, and the up and down directions in FIG. 2 will be referred to as “upper and lower”, unless otherwise specified. The orientation of the power storage device 1 when in use is, however, not limited thereto.

The power storage device 1 includes a housing body 70, a power storage device element 100, a tab 90A, and a tab film 90B. The housing body 70 includes an internal space S1 and a peripheral sealed part 80. The power storage device element 100 is housed in the internal space S1 of the housing body 70. The tab 90A is joined at one end to the power storage device element 100, and the other end thereof protrudes outward from the peripheral sealed part 80 of the housing body 70, and is welded to the peripheral sealed part 80 via the tab film 90B at a portion between the two ends.

The housing body 70 includes a container 70A. The container 70A is constituted to include packaging materials 71 and 72. In an outer peripheral portion of the container 70A in plan view, the packaging materials 71 and 72 are heat sealed and fused together, thereby forming the peripheral sealed part 80. The internal space S1 of the container 70A cut off from the external space is formed by this peripheral sealed part 80. The peripheral sealed part 80 demarcates the periphery of the internal space S1 of the container 70A. Note that the mode of heat sealing referred to here is envisaged to include modes such as ultrasonic welding and heat welding from a heat source. In any case, the peripheral sealed part 80 refers to a portion in which the packaging materials 71 and 72 are integrally formed through fusing. Note that, as shown in FIG. 2, in the portion of the peripheral sealed part 80 where the tab 90A and the tab film 90B are sandwiched, the packaging material 72, the tab 90A, a pair of tab films 90B and the packaging material 71 are integrally formed, and, in the portion of the peripheral sealed part 80 where only the pair of tab films 90B are sandwiched, the packaging material 72, the pair of tab films 90B and the packaging material 71 are integrally formed.

The packaging materials 71 and 72 are constituted by a resin molded article or a film, for example. The resin molded article referred to here can be manufactured by methods such as injection molding, pressure molding, vacuum molding and blow molding, and in-mold molding may be performed in order to impart designability and functionality. The type of resin can be polyolefin, polyester, nylon, ABS and the like. Also, the film referred to here is, for example, a resin film that can be manufactured by a method such as an inflation method or a T-die method, or a film obtained by laminating such a resin film on a metal foil. Also, the film referred to here may or may not be a stretched film, and may be a single-layer film or a multilayer film. Also, the multilayer film referred here may be manufactured by a coating method, may be a film obtained by a plurality of films being adhered together by an adhesive or the like, or may be manufactured by a multilayer extrusion method.

As described above, the packaging materials 71 and 72 can be constituted in various ways, and, in the present embodiment, are constituted by a laminate film. The laminate film can be a laminate obtained by laminating a base material layer, a barrier layer, and a heat-sealable resin layer. The base material layer functions as a base material of the packaging materials 71 and 72, and is typically a resin layer forming an outer layer side of the container 70A and having insulating qualities. The barrier layer functions to prevent at least moisture or the like from infiltrating into the power storage device 1 in addition to improving the strength of the packaging materials 71 and 72, and is typically a metal layer made of an aluminum alloy foil or the like. The heat-sealable resin layer is typically made of a resin that is heat sealable such as polyolefin and forms the innermost layer of the container 70A.

The container 70A is not particularly limited in terms of shape, and can be bag-shaped (pouch-shaped), for example. The pouch shape referred to here includes a three-side seal pouch, a four-side seal pouch, a pillow pouch and a gusseted pouch. The container 70A of the present embodiment, however, has a shape such as shown in FIGS. 1 and 2, and is manufactured by the packaging material 71 molded in a tray shape and the packaging material 72 likewise molded in a tray shape and overlaid on the packaging material 71 being heat sealed along an outer peripheral portion thereof in plan view. The packaging material 71 includes a polygonal ring-shaped flange part 71B that corresponds to an outer peripheral portion in plan view, and a molded part 71A that is continuous with an inner edge of the flange part 71B and bulges downward therefrom. Similarly, the packaging material 72 includes a polygonal ring-shaped flange part 72B that corresponds to an outer peripheral portion in plan view, and a molded part 72A that is continuous with the inner edge of the flange part 72B and bulges upward therefrom. The packaging materials 71 and 72 are overlaid one on the other such that the respective molded parts 71A and 72A bulge in opposite directions to each other. In this state, the flange part 71B of the packaging material 71 and the flange part 72B of the packaging material 72 are integrally formed through heat sealing, and constitute the peripheral sealed part 80. The peripheral sealed part 80 extends around the entire outer periphery of the container 70A and is formed in a polygonal ring shape. Note that one of the packaging materials 71 and 72 may be sheet-shaped.

The power storage device element 100 includes at least a cathode, an anode and an electrolyte, and is a power storage member such as a lithium-ion battery (secondary battery) or a capacitor. When an anomaly occurs in the power storage device element 100, gas can be generated in the internal space S1 of the container 70A. In the case where the power storage device 1 is a lithium-ion battery, gases such as volatile organic solvent, carbon monoxide, carbon dioxide, methane, ethane, hydrogen and hydrogen fluoride can be generated in the internal space S1 of the container 70A, due to volatilization of organic solvent which is the electrolyte and decomposition of the electrolyte. In the case where the power storage device 1 is a capacitor, gas can be generated in the internal space S1 of the container 70A due to a chemical reaction in the capacitor. Also, the power storage device 1 may be a solid-state battery, in which case the power storage device element 100 can include a solid electrolyte that can generate gas. For example, if the solid electrolyte is a sulfide-based solid electrolyte, hydrogen sulfide gas can be generated.

The tab 90A is a metal terminal that is used for power input/output of the power storage device element 100. The tab 90A is disposed one at each of the end portions of the peripheral sealed part 80 of the container 70A in the right-left direction, with one tab 90A constituting a terminal on the cathode side and the other tab 90A constituting a terminal on the anode side. One end portion of each tab 90A in the left-right direction is electrically connected to an electrode (cathode or anode) of the power storage device element 100 in the internal space S1 of the container 70A, and the other end portion protrudes outward from the peripheral sealed part 80. The form of the power storage device 1 described above is particularly preferably for use in an electrically driven vehicle such as an electric car or a hybrid car in which a large number of the power storage devices 1 are connected in series and used at a high voltage, for example. Note that the two tabs 90A constituting the terminals of the cathode and anode are not particularly limited in terms of attachment position, and may be disposed on the same one side of the peripheral sealed part 80, for example.

The tabs 90A are constituted by a metal material such as aluminum, nickel or copper, for example. In the case where the power storage device element 100 is a lithium-ion battery, the tab 90A that is connected to the cathode is typically made of aluminum or the like, and the tab 90A that is connected to the anode is typically made of copper, nickel or the like.

The tab 90A on the left side is sandwiched between the packaging materials 71 and 72 via the tab films 90B at the left end portion of the peripheral sealed part 80. The tab 90A on the right side is also sandwiched between the packaging materials 71 and 72 via the tab films 90B at the right end portion of the peripheral sealed part 80.

The tab film 90B is a so-called adhesive film, and is configured to adhere to both the packaging materials 71 and 72 and the tabs 90A (metal). Use of the tab films 90B enables the tabs 90A and the innermost layers (heat-sealable resin layers) of the packaging materials 71 and 72 to be fixed, even if they are different materials. Note that the tab films 90B are integrally formed with the tabs 90A by being welded and fixed thereto in advance, and the peripheral sealed part 80 is integrally formed, as shown in FIG. 2, by the tabs 90A to which the tab films 90B are fixed being sandwiched between the packaging materials 71 and 72 and welded.

When gas is generated in the internal space S1 of the container 70A following operation of the power storage device 1, the pressure of the internal space S1 gradually increases. When the pressure of the internal space S1 increases excessively, the container 70A could possibly burst and the power storage device 1 could be damaged. The housing body 70 includes a valve structure 10 as a mechanism for preventing such a situation. The valve structure 10 is a gas vent valve for adjusting the pressure of the internal space S1, and is, for example, attached to the peripheral sealed part 80 of the container 70A. Hereinafter, the configuration of the valve structure 10 will be described in detail.

1-2. Configuration of Valve Structure

Figure 3:
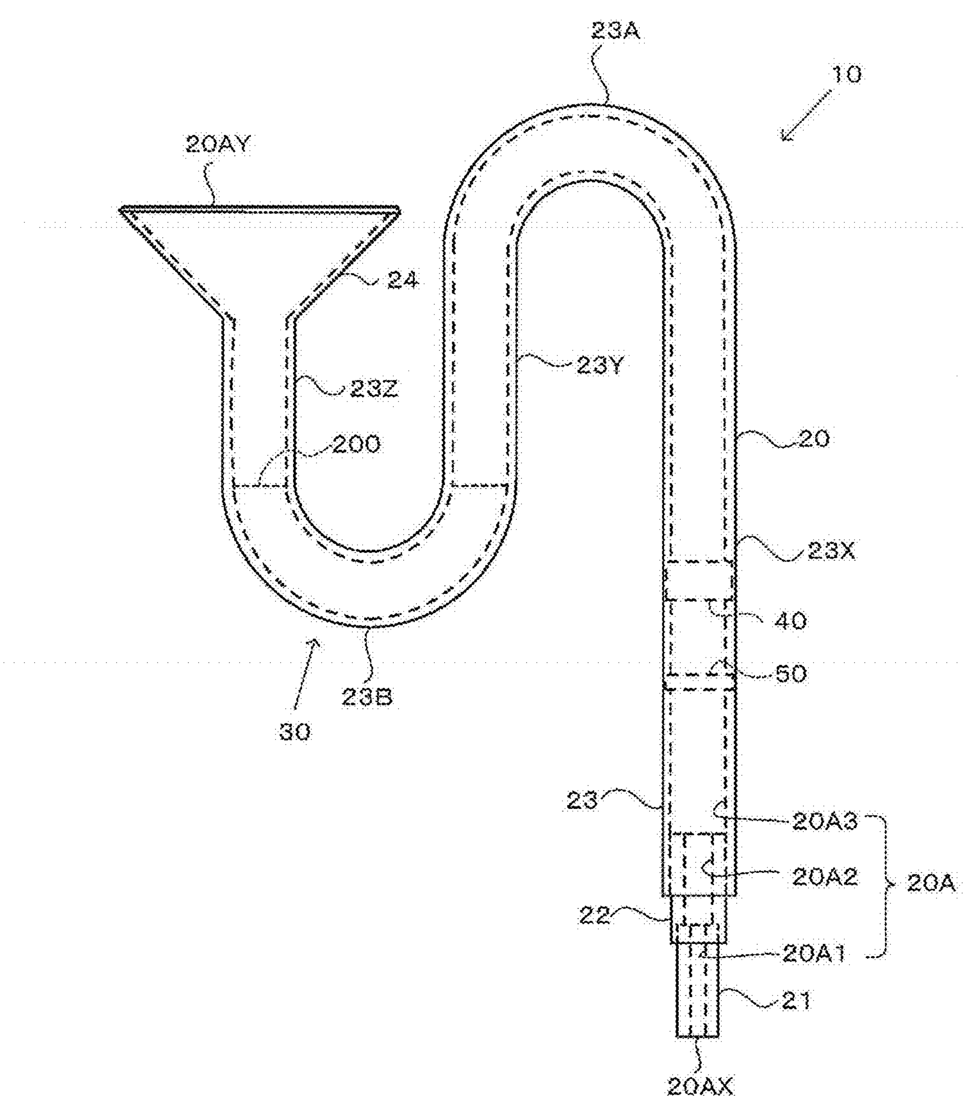
FIG. 3 is a front view of the valve structure in FIG. 1.

FIG. 3 is a front view of the valve structure 10. In FIG. 3, however, parts that are originally not visible from the outside are partially shown with dashed lines for reference purposes. The valve structure 10 includes a valve outer body 20 inside which a passage 20A is formed, and a liquid reservoir part 30, a check valve 40 and a membrane filter 50 that are located inside the passage 20A.

The material constituting the valve outer body 20 is freely selectable. The material constituting the valve outer body 20 is, for example, a metal or a synthetic resin. The metal is, for example, stainless steel or aluminum. The synthetic resin is, for example, an olefin. In the present embodiment, the material constituting the valve outer body 20 is stainless steel. The passage 20A that is formed inside the valve outer body 20 is a passage that communicates the inside of the container 70A with outside. The passage 20A has an opening 20AX facing the internal space S1 of the container 70A and an opening 20AY facing the external space.

The valve outer body 20 has an attachment part 21, a connection part 22, a tubular part 23, and a discharge part 24. In the present embodiment, the attachment part 21, the connection part 22, the tubular part 23 and the discharge part 24 are continuously disposed in the stated order in a direction from the inside of the container 70A to outside.

The attachment part 21 is a part for attaching the valve structure 10 to the container 70A. The attachment part 21 is attached due, specifically, to being heat sealed together with the packaging materials 71 and 72 via an adhesive member 60 (see FIG. 1), when the peripheral sealed part 80 is formed by the packaging materials 71 and 72 being heat sealed and fused together at the time of forming the container 70A. Alternatively, when the packaging materials 71 and 72 are heat sealed and fused together to form the peripheral sealed part 80, a portion can be purposely left unfused, the adhesive member 60 can then be integrally formed with the attachment part 21 by being welded and fixed thereto in advance, and the attachment part 21 with the adhesive member 60 fixed thereto can be attached by being inserted into the unfused portion and heat sealed between the packaging materials 71 and 72 of the unfused portion. Due to this heat sealing, the outer peripheral surface of the attachment part 21 and the packaging materials 71 and 72 are fused and joined, and, as shown in FIG. 2, the attachment part 21 is fixed to the peripheral sealed part 80 in a mode of being sandwiched between the packaging material 71 and the packaging material 72.

The adhesive member 60 is configured to adhere to both the valve structure 10 and the housing body 70 by heat sealing. The adhesive strength between the adhesive member 60 and the housing body 70 in the case where the valve structure 10 is attached to the housing body 70 is such the adhesion between the adhesive member 60 and the housing body 70 is not broken, even if the pressure of the internal space S1 of the housing body 70 reaches the pressure at which the check valve 40 opens. Various known adhesive films can be employed as the adhesive member 60. The adhesive member 60 may, for example, be a single-layer film of maleic anhydride-modified polypropylene (PPa), or a laminate film having multiple layers consisting of a PPa layer, a polyethylene naphthalate (PEN) layer and a PPa layer. Also, the adhesive member 60 may be a laminate film having multiple layers consisting of a PPa layer, a polypropylene (PP) layer and a PPa layer. Instead of the above PPa resin, a metal adhesive resin such as an ionomer resin, modified polyethylene or EVA is also applicable. In the present embodiment, the adhesive member 60 employs a laminate film having a three-layer structure containing a core material and consisting of a PPa layer, a polyester fiber layer and a PPa layer. Various known materials can be employed as the core material apart from the polyester fiber mentioned above. For example, the core material may be a polyester film made of PEN or the like, or may be polyamide fiber or carbon fiber.

The connection part 22 is a part that connects the attachment part 21 to the tubular part 23. The connection part 22 is disposed outside the peripheral sealed part 80. In the present embodiment, the connection part 22 is integrally formed with the attachment part 21. The connection part 22 may also be constituted separately from the attachment part 21. The connection part 22 is connected to the tubular part 23 by being inserted into the tubular part 23. The connection part 22 may also be joined to the tubular part 23 by welding or crimping.

Figure 4:
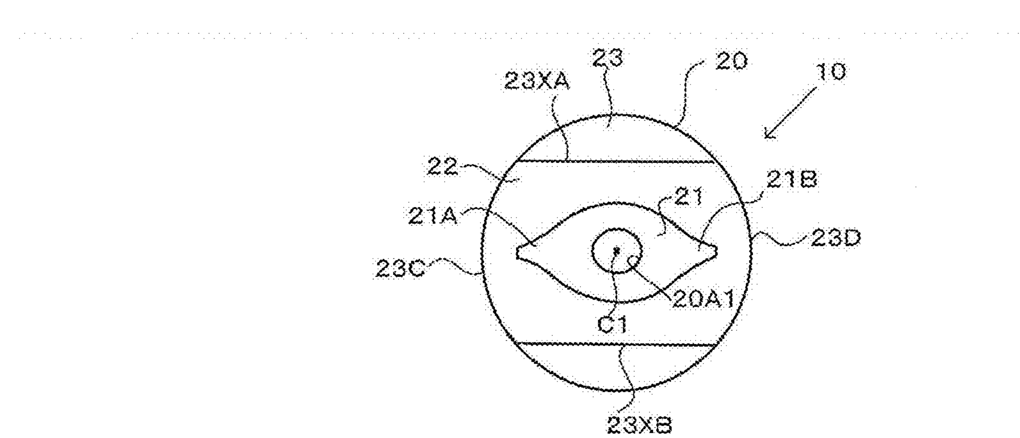
FIG. 4 is the bottom view of the valve structure of FIG. 3.

The attachment part 21 and the connection part 22 have a common central axis C1 (see FIG. 4). In other words, the attachment part 21 and the connection part 22 extend coaxially about the central axis C1. The attachment part 21 has a first passage 20A1. The connection part 22 has a second passage 20A2. The first passage 20A1 and the second passage 20A2 extend coaxially with the central axis C1 as the central axis. In the present embodiment, a cross section orthogonal to the central axis C1 of the first passage 20A1 and the second passage 20A2 is circular. The first passage 20A1 communicates with the second passage 20A2 and together constitute part of the passage 20A. The second passage 20A2 is disposed further outside of the container 70A than is the first passage 20A1.

FIG. 4 is a bottom view of the valve outer body 20. The attachment part 21 has a noncircular outer shape when viewed along the direction in which the central axis C1 extends. More specifically, the attachment part 21 has a first wing-shaped part 21A formed to become thinner toward the left and a second wing-shaped part 21B formed to become thinner toward the right from the central portion in the left-right direction, when viewed along the direction in which the central axis C1 extends. Thus, in the present embodiment, the attachment part 21 becomes thicker approaching the central portion of the power storage device 1 in the width direction (left-right direction), and becomes thinner approaching the end portions of the power storage device 1 in the width direction (left-right direction).

In the present embodiment, since the first wing-shaped part 21A and the second wing-shaped part 21B are formed, the outer peripheral surface of the attachment part 21 describes a smooth curved surface, even in the lower half that is covered by the packaging material 71 and the upper half that is covered by the packaging material 72. Also, compared to the case where the attachment part 21 is cylindrically formed, for example, the thickness of the power storage device 1 in the up-down direction changes smoothly due to the first wing-shaped part 21A and the second wing-shaped part 21B, in the position where the peripheral sealed part 80 transitions from not sandwiching the attachment part 21 to sandwiching the attachment part 21. As a result, an unreasonable force is not applied to the packaging materials 71 and 72 in the portion of the peripheral sealed part 80 around the position where the attachment part 21 is attached. The attachment part 21 can thus be firmly fixed to the peripheral sealed part 80 via the adhesive member 60.

The connection part 22 generally has an outer shape in which a column having the central axis C1 as its central axis is partially cut away. More specifically, the connection part 22 generally has an outer shape in which a column having the central axis C1 as its central axis is cut away in planes that are at a certain distance from the central axis C1 and symmetrical about the central axis C1. Therefore, the connection part 22 has a first plane 23XA and a second plane 23XB constituting a pair of planes. The first plane 23XA and the second plane 23XB are parallel (including the case of being substantially parallel; this similarly applies below) to each other. The first plane 23XA and the second plane 23XB are parallel (including the case of being substantially parallel; this similarly applies below) to the direction in which the central axis C1 extends. Also, in the present embodiment, the first plane 23XA and the second plane 23XB are parallel (including the case of being substantially parallel; this similarly applies below) to the direction in which the peripheral sealed part 80 extends. The outer peripheral surface of the connection part 22 is constituted by the first plane 23XA and second plane 23XB and curved surfaces 23C and 23D that connect the first plane 23XA and second plane 23XB. The curved surfaces 23C and 23D are both arc-shaped about the central axis C1 when viewed along the direction in which the central axis C1 extends, and overlap with the outer shape of the cylindrical part 23. A connection part 22 such as described above can be formed by cutting the outer peripheral surface of the cylindrical member, such that the first plane 23XA and the second plane 23XB are formed. Since the outer shape of the connection part 22 is constituted in this way, the valve structure 10 is easily grasped. Conveying the valve structure 10 to the machining position and fixing the valve structure 10 at the machining position, for example, are thereby easily carried out. The valve structure 10 can thus be easily attached to the container 70A.

The tubular part 23 shown in FIG. 3 is cylindrical, for example, and a third passage 20A3 is formed therein. The third passage 20A3 communicates with the first passage 20A1 and the second passage 20A2. The passage 20A is constituted by the first passage 20A1, the second passage 20A2, and the third passage 20A3. The tubular part 23 has a first straight part 23X, a first curved part 23A, a second straight part 23Y, a second curved part 23B, and a third straight part 23Z. The first straight part 23X has the central axis C1 as its central axis and extends coaxially with the attachment part 21 and the connection part 22. The first curved part 23A is continuous with the first straight part 23X and has an upwardly convex shape. The second straight part 23Y is continuous with the first curved part 23A. The second curved part 23B is continuous with the second straight part 23Y and has a downwardly convex shape. The third straight part 23Z is continuous with the second curved part 23B. As a result, the tubular part 23 extends while curving in an S-shape as a whole.

The liquid reservoir part 30 keeps moisture from infiltrating into the internal space S1. The liquid reservoir part 30 is located inside the passage 20A and stores a liquid 200 through which gas generated by the power storage device element 100 is permeable. In the present embodiment, the liquid reservoir part 30 is disposed in the second curved part 23B, and the function thereof is realized by the curved shape of the second curved part 23B. That is, in the case where the power storage device 1 is used with the upper side in FIG. 1 facing upward, the liquid 200 can be stored in the liquid reservoir part 30. On the other hand, even in the case where the power storage device 1 is used with the direction perpendicular to the diagram surface of FIG. 1 as the up-down direction, the liquid 200 can be stored in the liquid reservoir part 30, by attaching a partitioning member 380 (see FIGS. 6 and 7) described later, for example. The position of the liquid reservoir part 30 inside the tubular part 23 is, however, not limited thereto and is freely selectable. In a preferred example, as shown in FIG. 1, the liquid reservoir part 30 is located toward the inside of the container 70A, away from the opening 20AY, such that the liquid 200 stored in the liquid reservoir part 30 does not readily flow outside of the valve outer body 20 through the opening 20AY.

The liquid 200 that is stored in the liquid reservoir part 30 is freely selectable, as long as at least some of the gas generated by the power storage device element 100 is permeable therethrough and the material does not allow liquid to permeate through. In the present embodiment, the liquid 200 is liquid paraffin. An ionic liquid, a liquid oil such as silicone oil, or the like can also be used as the liquid 200. In a preferred example, the liquid 200 preferably has the characteristic of existing as a liquid in the normal use environment of the power storage device 1. From such a viewpoint, the melting point of the liquid 200 is preferably 10° C. or lower, and more preferably 0° C. or lower. Similarly, the boiling point of the liquid 200 is preferably 150° C. or higher. In the present embodiment, the temperatures illustrated as the melting point and boiling point of the liquid 200 are temperatures in the normal use environment of the power storage device 1. The power storage device 1 of the present embodiment is used under atmospheric pressure or a vacuum, for example. The power storage device 1 may also be used in an environment other than under atmospheric pressure or a vacuum.

The discharge part 24 is continuous with the third straight part 23Z of the tubular part 23. In the present embodiment, the discharge part 24 is integrally formed with the tubular part 23. The discharge part 24 may also be formed separately from the tubular part 23. The discharge part 24 has the opening 20AY. The discharge part 24 is shaped such that the opening area of the opening 20AY increases toward the outside from the nearer the inside of the container 70A. The gas that was generated by the power storage device element 100 and has permeated through the liquid 200 stored in the liquid reservoir part 30 is discharged outside through the opening 20AY.

The check valve 40 opens when the internal pressure of the container 70A increases due to the gas generated inside the container 70A by the power storages device element 100, allowing the gas to pass toward the outside from nearer the inside the container 70A, and the check valve 40 closes when the internal pressure of the container 70A falls, and prevents gas from passing toward the outside from nearer the inside of the container 70A. That is, the check valve 40 is a gas vent valve. Since the valve structure 10 has the check valve 40, gas or the like generated by the power storage device element 100 can be kept from flowing back toward the inside of the container 70A from the outside, for example. Also, the internal pressure of the internal space S1 can be easily controlled. The position at which the check valve 40 is disposed in the valve outer body 20 is freely selectable. In the present embodiment, the check valve 40 is disposed further toward the inside of the container 70A than is the liquid reservoir part 30, and, more specifically, the check valve is disposed inside the first straight part 23X of the tubular part 23. The check valve 40 is not particularly limited in terms of structure, and can be a spring valve. The spring valve has a valve seat, a valve body, and a spring. The spring valve opens due to the valve body moving away from the valve seat, when the internal pressure of the container 70A increases, and closes due to the valve body being brought into intimate contact with the valve seat through being pressed by the spring, when the internal pressure of the container 70A decreases. Alternatively, the check valve 40 can be a poppet valve, a duckbill valve, an umbrella valve, a diaphragm valve, or the like.

When gas is generated in the internal space S1 of the container 70A following operation of the power storage device 1, the pressure of the internal space S1 gradually increases. When the pressure of the internal space S1 increases to a predetermined pressure, the check valve 40 opens, and gas passes through the opening 20AX, the first passage 20A1, the second passage 20A2, the third passage 20A3, and the check valve 40. At least some of the gas that has passed through the check valve 40 permeates through the liquid 200 that is stored in the liquid reservoir part 30 and is discharged outside through the opening 20AY. A situation such as where the internal pressure of the internal space S1 increases excessively and the container 70A bursts is thus unlikely to occur.

The membrane filter 50 keeps the organic solvent that is contained in the power storage device element 100 from passing through the passage 20A and flowing outside of the valve outer body 20. In the valve outer body 20, the position in which the membrane filter 50 is disposed is freely selectable, as long as that position is further toward the inside of the container 70A than is the liquid reservoir part 30. In the present embodiment, the membrane filter 50 is disposed in the first straight part 23X of the tubular part 23, further toward the inside of the container 70A than is the check valve 40. Also, in the present embodiment, a lid is preferably disposed in the vicinity of the opening 20AY, such that the liquid 200 does not leak out through the opening 20AY. The material constituting the lid material is, for example, a metal mesh, a synthetic resin mesh, or a nonwoven fabric.

1-3. Operation and Effect of Valve Structure

In the case where moisture infiltrates into the valve outer body 20 through the opening 20AY, infiltration of that moisture to nearer the inside of the container 70A than is the liquid reservoir part 30 is prevented by the liquid 200 that is stored in the liquid reservoir part 30. Moisture is thus kept from infiltrating into the container 70A.

1-4. Effects of First Embodiment

With the valve structure 10 constituted as described above, the following effects can be further obtained.

1-4-1

The liquid reservoir part 30 is located toward the inside of the container 70A, away from the opening 20AY. The liquid 200 that is stored in the liquid reservoir part 30 thus does not readily flow outside through the opening 20AY.

1-4-2

The function of the liquid reservoir part 30 is realized by the curved shape of the second curved part 23B. The configuration of the liquid reservoir part 30 can thus be simplified.

1-5. Testing

The inventor of the present invention manufactured power storage devices of a working example and a reference example, and carried out testing to confirm the extent to which moisture infiltrates into the container. Note that, hereinafter, for convenience of description, elements constituting the power storage devices of the working example and the reference example that are the same as the first embodiment will be described with the same reference numerals as the first embodiment.

The power storage device 1 of the working example had generally the same configuration as the power storage device 1 of the first embodiment. In the power storage device 1 of the working example, the tabs 90A and the tab films 90B were omitted, and only an electrolyte was included as the power storage device element 100. The mass of the electrolyte was 3 g. Liquid paraffin was stored in the liquid reservoir part 30 of the power storage device 1 of the working example as the liquid 200. The volume of the liquid 200 stored in the liquid reservoir part 30 was 1 ml.

The power storage device 1 of the reference example had a similar configuration to the power storage device 1 of the working example, except that the liquid 200 was not stored in the liquid reservoir part 30 and the opening 20AY of the discharge part 24 was closed.

In this testing, the power storage devices 1 of the working example and the reference example were stored for one week under conditions of 60° C. in temperature at 90% humidity. Thereafter, the containers 70A were opened and the moisture content in the electrolyte was measured using a Karl Fischer moisture measuring device.

The moisture content in the electrolyte of the power storage device 1 of the reference example was 200 ppm. The moisture content in the electrolyte of the power storage device 1 of the working example was also 200 ppm. This result confirmed that moisture did not readily infiltrate the power storage device 1 of the working example from outside, similarly to the case where the opening 20AY was closed.

2. Second Embodiment

In a second embodiment, the configuration of the valve structure 10 differs, compared to the first embodiment. Other configurations are basically similar to the first embodiment. Hereinafter, configurations that are the same as the first embodiment will be given the same reference numerals and description thereof will be omitted, with the following description focusing on the differences from the first embodiment.

2-1. Configuration of Valve Structure

Figure 5:
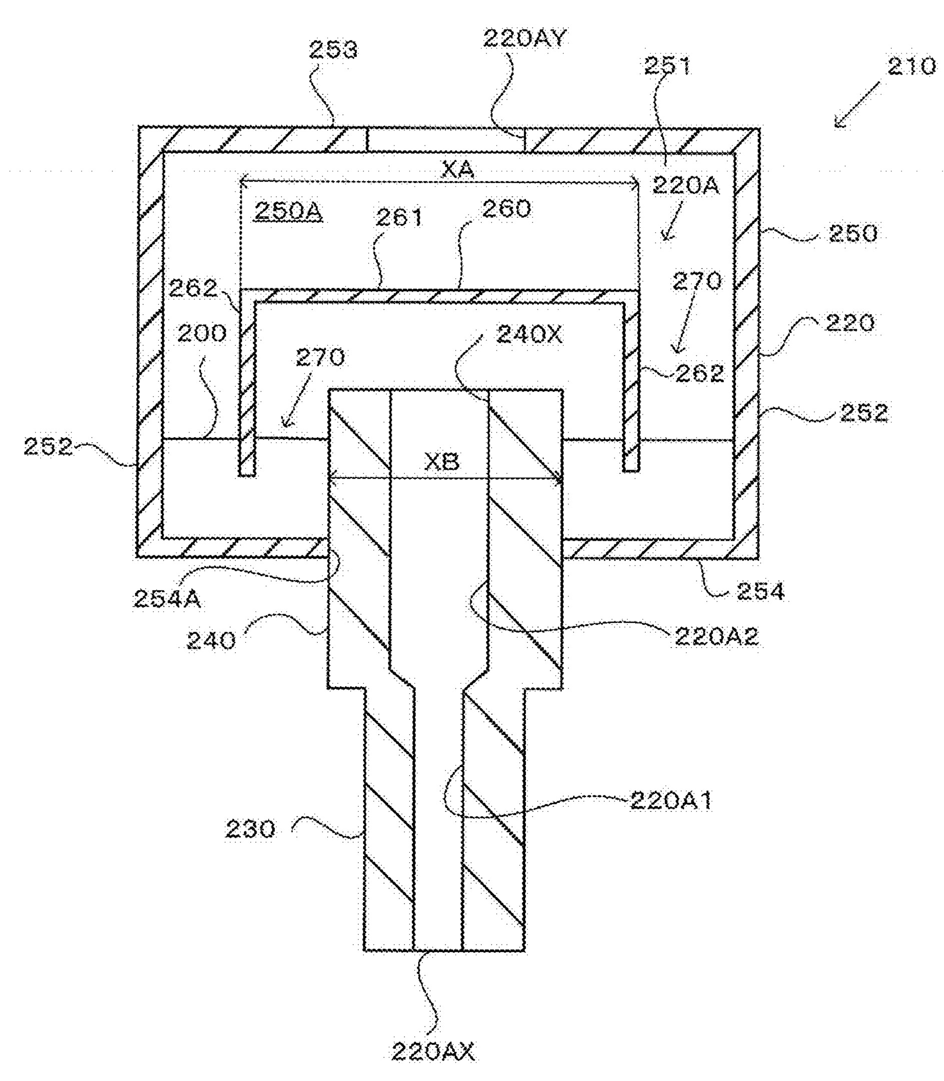
FIG. 5 is a cross-sectional view of the valve structure of a second embodiment.

FIG. 5 is a cross-sectional view of a valve structure 210 provided in the power storage device 1 of the second embodiment. The valve structure 210 includes a valve outer body 220 inside which a passage 220A is formed, and a liquid reservoir part 270 located inside the passage 220A. Note that, in the present embodiment, similarly to the first embodiment, at least one of the check valve 40 and the membrane filter 50 can also be disposed in the passage 220A, further toward the inside of the container 70A than is the liquid reservoir part 270.

The passage 220A that is formed inside the valve outer body 220 is a passage that communicates the inside of the container 70A (see FIG. 1) with outside. The passage 220A has an opening 220AX facing the internal space S1 of the container 70A and an opening 220AY facing the external space. The valve outer body 220 has an attachment part 230, a tubular part 240, a casing 250, and a guidance wall 260.

The attachment part 230 is a part for attaching the valve structure 210 to the container 70A, and has a substantively similar configuration and function to the attachment part 21 of the first embodiment. A first passage 220A1 is formed inside the attachment part 230.

The tubular part 240 is generally cylindrical, and a second passage 220A2 is formed therein. The tubular part 240 may be integrally formed with the attachment part 230 or may be formed separately. The second passage 220A2 communicates with the first passage 220A1. The maximum diameter of the second passage 220A2 is larger than the maximum diameter of the first passage 220A1. An opening 240X facing an internal space 250A of the casing 250 is formed in an end portion of the cylindrical part 240 on the opposite side to the attachment part 230.

The casing 250 has a front wall (not shown), a back wall 251, a pair of side walls 252, an upper wall 253, and a bottom wall 254. The front wall, the back wall 251, the pair of side walls 252, the upper wall 253 and the bottom wall 254 of the casing 250 are joined together, such that the internal space 250A is formed. The passage 220A is constituted by the first passage 220A1, the second passage 220A2, and the internal space 250A. The front wall and the back wall 251 oppose each other across the internal space 250A and the guidance wall 260. The pair of sidewalls 252 oppose each other across the internal space 250A and the guidance wall 260. The upper wall 253 and the bottom wall 254 oppose each other across the internal space 250A and the guidance wall 260.

The opening 220AY for discharging gas that has passed through the liquid reservoir part 270 into the external space is formed in the upper wall 253. The opening 220AY is formed generally in the middle in the left-right direction. An opening 254A into which the tubular part 240 is inserted is formed in the bottom wall 254. The maximum diameter of the aperture 254A is substantively equal to the maximum diameter of the tubular part 240, or slightly larger than the maximum diameter of the tubular part 240. The opening 254A is formed generally in the middle in the left-right direction.

The guidance wall 260 guides gas that has passed through the opening 240X of the tubular part 240 to the liquid reservoir part 270. The guidance wall 260 is supported by at least one of the front wall and the back wall 251. The guidance wall 260 has a first wall 261 and a pair of second walls 262. The first wall 261 is disposed so as to oppose the opening 240X of the tubular part 240. A length XA of the first wall 261 in the left-right direction is longer than a maximum diameter XB of the tubular part 240. The first wall 261 thus comes in contact with much of the gas that passes through the opening 240X and is able to guide the gas to the liquid reservoir part 270. The second walls 262 extend toward the bottom wall 254 from end portions of the first wall 261 in the left-right direction. Gas that has passed through the opening 240X of the tubular part 240 contacts the first wall 261, disperses in the left-right direction, and is guided along the second walls 262 to the liquid reservoir part 270.

The liquid reservoir part 270 is located in a portion partitioned by the pair of side walls 252, the tubular part 240, and the bottom wall 254. The liquid surface of the liquid 200 stored in the liquid reservoir part 270 is located closer to the bottom wall 254 than is the opening 240X of the cylindrical part 240.

2-2. Operation and Effect of Valve Structure

The power storage device 1 is used in a state where the valve structure 210 is located above the housing body 70. In the case where the pressure of the internal space S1 increases to a predetermined pressure due to gas generated by the power storage device element 100, the gas passes through the first passage 220A1, the second passage 220A2 and the opening 240X and flows to the internal space 250A. The gas that flows to the internal space 250A comes in contact with the first wall 261 of the guidance wall 260 and disperses in the left-right direction. At least some of the gas dispersed in the left-right direction flows along the second walls 262 and permeates through the liquid 200 that is stored in the liquid reservoir part 270. The gas that has permeated through the liquid 200 rises through the internal space 250A and is discharged into the external space through the opening 220AY. A situation such as where the internal pressure of the internal space S1 increases excessively and the container 70A bursts is thus unlikely to occur. On the other hand, in the case where moisture infiltrates into the valve outer body 220 through the opening 220AY, infiltration of that moisture to nearer the inside of the container 70A than is the liquid reservoir part 270 is prevented by the liquid 200 that is stored in the liquid reservoir part 270. Moisture is thus kept from infiltrating into the container 70A.

2-3. Effects of Second Embodiment

With the valve structure 210 constituted as described above, the following effects can be further obtained.

2-3-1

The liquid reservoir part 270 is located toward the inside of the container 70A, away from the opening 220AY. The liquid 200 that is stored in the liquid reservoir part 270 thus does not readily flow outside through the opening 220AY.

2-3-2

The liquid reservoir part 270 is located in a portion partitioned by the pair of side walls 252, the tubular part 240, and the bottom wall 254. The configuration of the liquid reservoir part 270 can thus be simplified.

3. Third Embodiment

In a third embodiment, the configuration of the valve structure 10 differs, compared to the first embodiment. Other configurations are basically similar to the first embodiment. Hereinafter, configurations that are the same as the first embodiment will be given the same reference numerals and description thereof will be omitted, with the following description focusing on the differences from the first embodiment.

3-1. Configuration of Valve Structure

Figure 6:
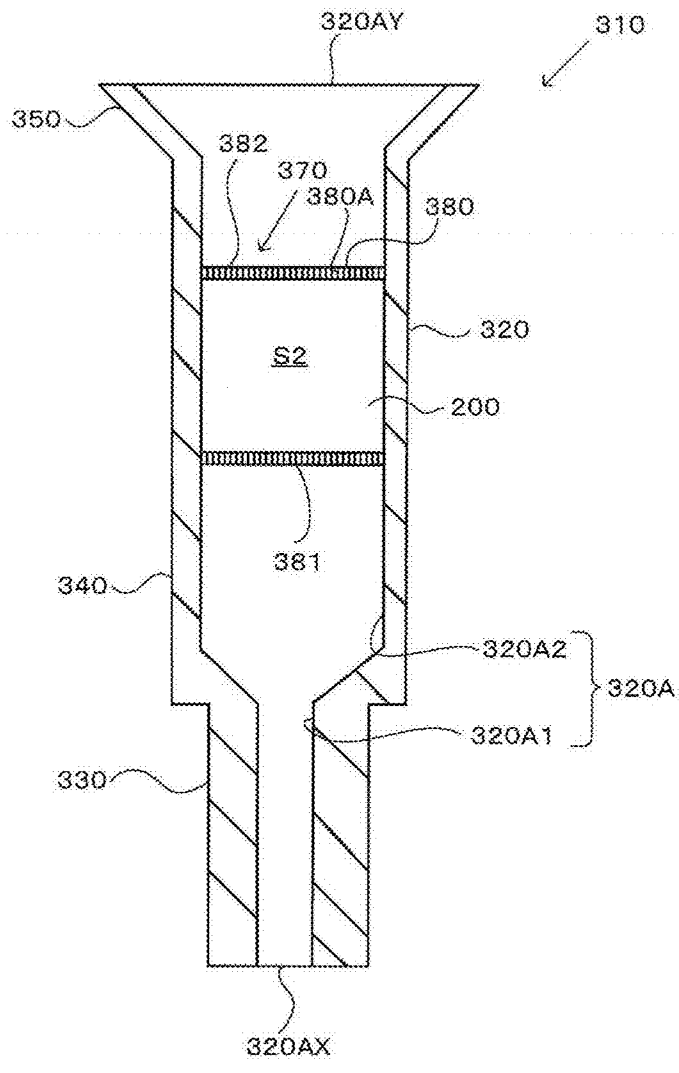
FIG. 6 is a cross-sectional view of the valve structure of a third embodiment.

FIG. 6 is a cross-sectional view of a valve structure 310 provided in the power storage device 1 of the third embodiment. The valve structure 310 includes a valve outer body 320 inside which a passage 320A is formed, and a liquid reservoir part 370 located inside the passage 320A. Note that, in the present embodiment, similarly to the first embodiment, at least one of the check valve 40 and the membrane filter 50 can also be disposed inside the passage 320A, further toward the inside of the container 70A than is the liquid reservoir part 370.

The passage 320A that is formed inside the valve outer body 320 is a passage that communicates the inside of the container 70A (see FIG. 1) with outside. The passage 320A has an opening 320AX facing the internal space S1 of the container 70A and an opening 320AY facing the external space. The valve outer body 320 has an attachment part 330, a tubular part 340, and a discharge part 350.

The attachment part 330 is a part for attaching the valve structure 310 to the container 70A, and has a substantively similar configuration and function to the attachment part 21 of the first embodiment. A first passage 320A1 is formed inside the attachment part 330.

The tubular part 340 is generally cylindrical, and a second passage 320A2 is formed therein. The passage 320A is constituted by the first passage 320A1 and the second passage 320A2. The tubular part 340 decreases slightly in diameter proceeding from the opening 320AY to the opening 320AX. The tubular part 340 may be integrally formed with the attachment part 330 or may be formed separately. The second passage 320A2 communicates with the first passage 320A1. The maximum diameter of the second passage 320A2 is larger than the maximum diameter of the first passage 320A1.

The discharge part 350 is continuous with the tubular part 340. In the present embodiment, the discharge part 350 is integrally formed with the tubular part 340. The discharge part 350 may also be formed separately from the tubular part 340. The opening 320AY is formed in the discharge part 350. The discharge part 350 is shaped such that the opening area of the opening 320AY increases toward the outside from nearer the inside of the container 70A. The gas that was generated by the power storage device element 100 and has permeated through the liquid 200 stored in the liquid reservoir part 370 is discharged outside through the opening 320AY.

The liquid reservoir part 370 includes a partitioning member 380 that is supported by the valve body 320 and partitions a housing space S2 that houses the liquid 200 inside the passage 320A. The position of the liquid reservoir part 370 inside the tubular part 340 is freely selectable. In a preferred example, the liquid reservoir part 370 is located toward the inside of the container 70A, away from the opening 320AY, such that the liquid 200 stored in the liquid reservoir part 370 does not readily flow outside of the valve outer body 320 through the opening 320AY. The material constituting the partitioning member 380 is freely selectable, as long as the material can store the liquid 200 housed in the housing space S2. The material constituting the partitioning member 380 is, for example, a metal mesh, a synthetic resin mesh, or a nonwoven fabric.

The partitioning member 380 is, for example, circular in plan view. The partitioning member 380 includes a first partitioning member 381 and a second partitioning member 382 that is disposed in a position closer to the opening 320AY than is the first partitioning member 381. As described above, the tubular part 340 decreases slightly in diameter proceeding from the opening 320AY to the opening 320AX. The maximum outer diameters of the first partitioning member 381 and the second partitioning member 382 are equal to or less than the maximum inner diameter of the tubular part 340. The first partitioning member 381 and the second partitioning member 382 are thus supported by the tubular part 340 at any position inside the tubular part 340, when inserted into the tubular part 340 through the opening 320AY. The maximum outer diameter of the first partitioning member 381 is smaller than the maximum outer diameter of the second partitioning member 382. Note that, in the case where the inner diameter of the tubular part 340 is constant, a step portion protruding from the inner surface is formed in the tubular part 340 in order to support the partitioning member 380. The partitioning member 380 has a plurality of minute holes 380A. The holes 380A are of a size that is able to hold the liquid 200 housed in the housing space S2 by surface tension.

3-2. Operation and Effect of Valve Structure

The power storage device 1 is used in a state where the valve structure 310 is located above the housing body 70. In the case where the pressure of the internal space S1 increases to a predetermined pressure due to gas generated by the power storage device element 100, the gas passes through the opening 320AX and the first passage 320A1 and flows to the second passage 320A2. At least some of the gas that flows to the second passage 320A2 passes through the holes 380A of the first partitioning member 381 and permeates through the liquid 200 that is stored in the liquid reservoir part 370. The gas that has permeated through the liquid 200 passes through the holes 380A of the second partitioning member 382, rises through the second passage 320A2, and is discharged into the external space through the opening 320AY. A situation such as where the internal pressure of the internal space S1 increases excessively and the container 70A bursts is thus unlikely to occur. On the other hand, in the case where moisture infiltrates into the valve outer body 320 through the opening 320AY, infiltration of that moisture to nearer the inside of the container 70A than is the liquid reservoir part 370 is prevented by the liquid 200 that is stored in the liquid reservoir part 370. Moisture is thus kept from infiltrating into the container 70A.

3-3. Effects of Third Embodiment

With the valve structure 310 constituted as described above, the following effect can be further obtained.

The liquid reservoir part 370 is located toward the inside of the container 70A, away from the opening 320AY. The liquid 200 that is stored in the liquid reservoir part 370 thus does not readily flow outside through the opening 320AY.

4. Fourth Embodiment

In a fourth embodiment, the configuration of the valve structure 10 differs, compared to the third embodiment. Other configurations are basically similar to the third embodiment. Hereinafter, configurations that are the same as the third embodiment will be given the same reference numerals and description thereof will be omitted, with the following description focusing on the differences from the third embodiment.

4-1. Configuration of Valve Structure

Figure 7:
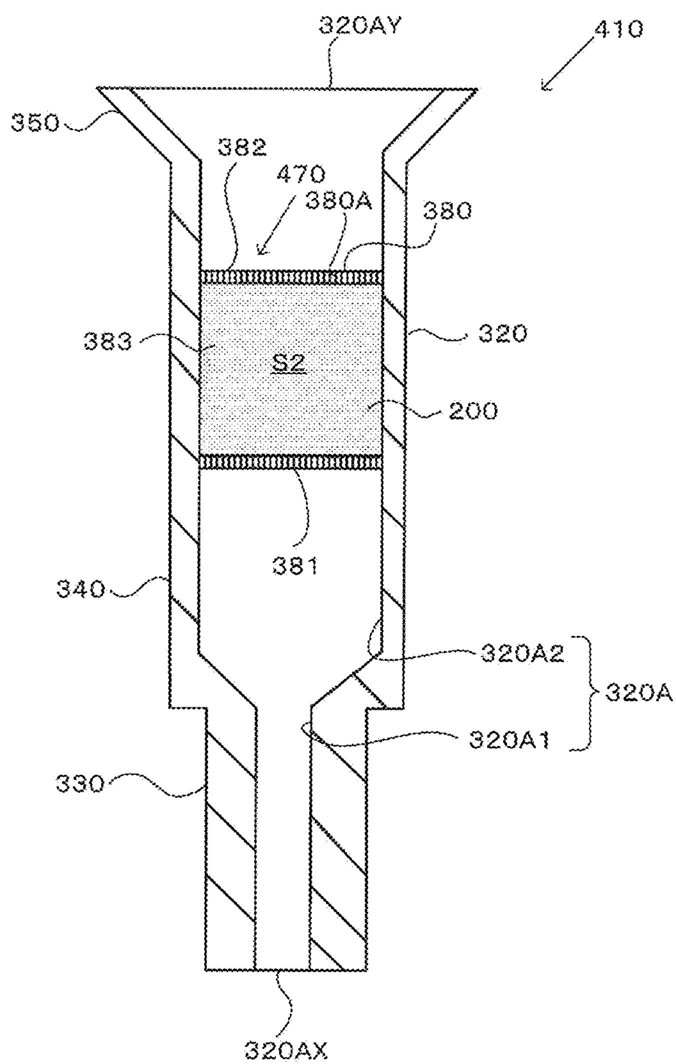
FIG. 7 is a cross-sectional view of the valve structure of a fourth embodiment.

FIG. 7 is a cross-sectional view of a valve structure 410 provided in the power storage device 1 of the fourth embodiment. The valve structure 410 has a liquid reservoir part 470. The liquid reservoir part 470 has a partitioning member 380 similar to the third embodiment and a holding member 383 capable of holding liquid 200. The holding member 383 is supported by at least one of the valve outer body 320 and the partitioning member 380. In this embodiment, the holding member 383 is supported by the first partitioning member 381.

The holding member 383 is shaped so as to seal the housing space S2. In the present embodiment, the holding member 383 is cylindrical. The material constituting the holding member 383 is freely selectable, as long as the material capable of holding the liquid 200. The material constituting the holding member 383 is, for example, a porous material. The porous material is, for example, paper, cloth, nonwoven fabric, sponge, or the like.

4-2. Operation and Effect of Valve Structure

According to the valve structure 410 of the fourth embodiment, the following effect is further obtained, in addition to operation and effect similar to the effect obtained by the valve structure 310 of the third embodiment.

Since the holding member 383 is disposed in the housing space S2, the liquid 200 can be easily stored in the liquid reservoir part 470.

5. Fifth Embodiment

In a fifth embodiment, the configuration of the valve structure 10 differs, compared to the first embodiment. Other configurations are basically similar to the first embodiment. Hereinafter, configurations that are the same as the first embodiment will be given the same reference numerals and description thereof will be omitted, with the following description focusing on the differences from the first embodiment.

5-1. Configuration of Valve Structure

Figure 8:
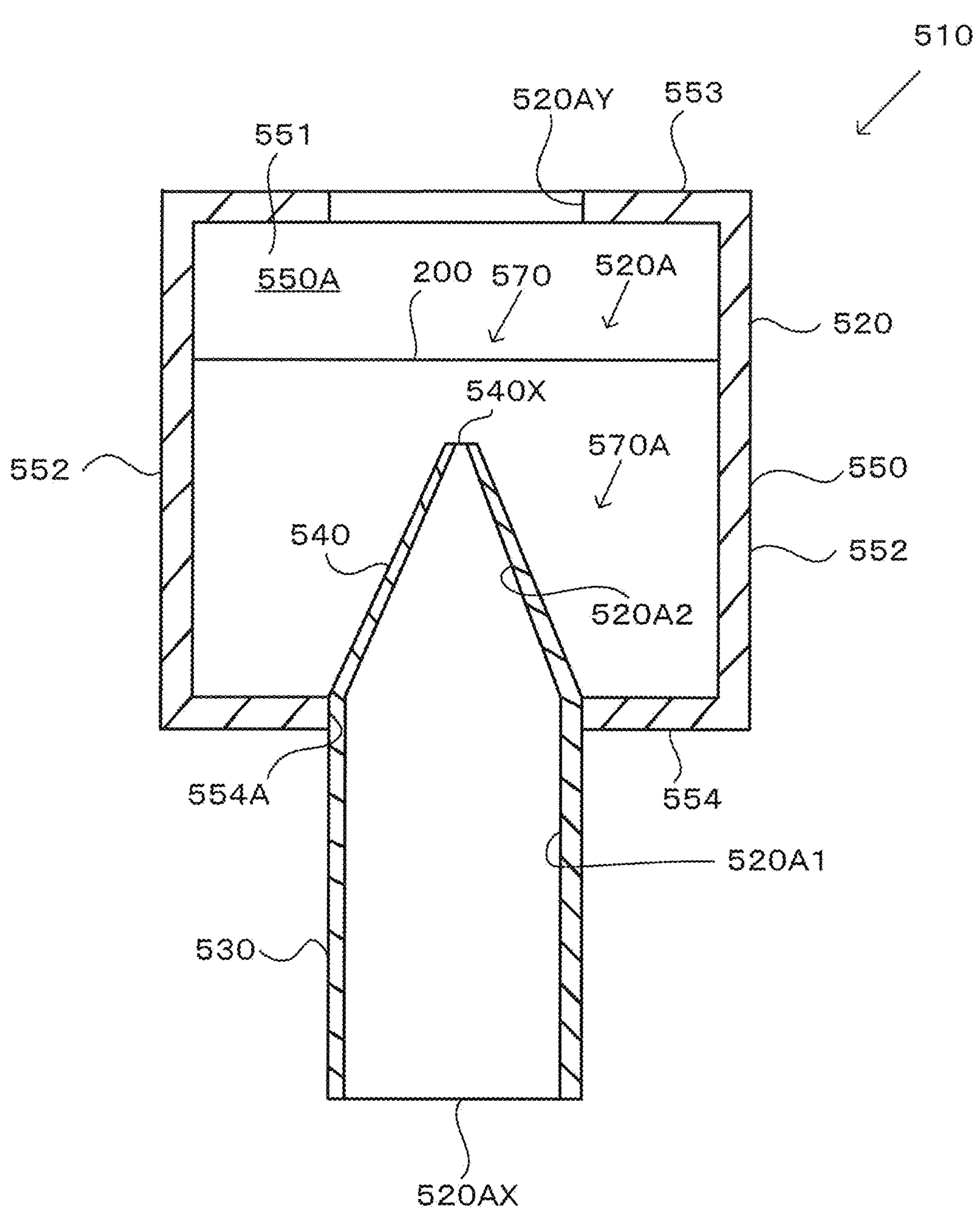
FIG. 8 is a cross-sectional view of the valve structure of a fifth embodiment.

FIG. 8 is a cross-sectional view of a valve structure 510 provided in the power storage device 1 of the fifth embodiment. The valve structure 510 includes a valve outer body 520 inside which a passage 520A is formed, and a liquid reservoir part 570 located inside the passage 520A. Note that, in the present embodiment, similarly to the first embodiment, at least one of the check valve 40 and the membrane filter 50 can also be disposed in the passage 520A, further toward the inside of the container 70A than is the liquid reservoir part 570.

The passage 520A that is formed inside the valve outer body 520 is a passage that communicates the inside of the container 70A (see FIG. 1) with outside. The passage 520A has an opening 520AX facing the internal space S1 of the container 70A and an opening 520AY facing the external space. The valve outer body 520 has an attachment part 530, a nozzle 540, and a casing 550.

The attachment part 530 is a part for attaching the valve structure 510 to the container 70A, and has a substantively similar configuration and function to the attachment part 51 of the first embodiment. A first passage 520A1 is formed inside the attachment part 530.

A second passage 520A2 is formed inside the nozzle 540. The nozzle 540 is joined to the attachment part 530 and tapers proceeding toward the liquid reservoir part 570, that is, proceeding toward the opening 520AY. The second passage 520A2 thus decreases in diameter proceeding toward the opening 520AY. An opening 540X facing an internal space 550A of the casing 550 is formed in the end portion of the nozzle 540 on the opposite side to the attachment part 530. The nozzle 540 may be integrally formed with the attachment part 530 or may be formed separately. The nozzle 540 is at least partially located in the internal space 550A of the casing 550. In the present embodiment, the nozzle 540 is entirely located in the internal space 550A.

The casing 550 has a front wall (not shown), a back wall 551, a pair of side walls 552, an upper wall 553, and a bottom wall 554. The front wall, the back wall 551, the pair of side walls 552, the upper wall 553 and the bottom wall 554 of the casing 550 are joined together, such that the internal space 550A is formed. The passage 520A is constituted by the first passage 520A1, the second passage 520A2, and the internal space 550A. The front wall and the back wall 551 oppose each other across the internal space 550A. The pair of sidewalls 552 oppose each other via the internal space 550A. The upper wall 553 and the bottom wall 554 oppose each other across the internal space 550A.

The opening 520AY for discharging gas that has passed through the liquid reservoir part 570 into the external space is formed in the upper wall 553. The opening 520AY is formed generally in the middle in the left-right direction. An opening 554A into which the attachment part 530 and the nozzle 540 are inserted is formed in the bottom wall 554. The maximum diameter of the opening 554A is substantively equal to the maximum diameter of the attachment 530, or slightly larger than the maximum diameter of the attachment part 530. The opening 554A is formed generally in the middle in the left-right direction.

The liquid reservoir part 570 is located in a portion partitioned by the pair of side walls 552, the nozzle 540, and the bottom wall 554. The liquid surface of the liquid 200 that is stored in the liquid reservoir part 570 is located closer to the upper wall 553 than is the opening 540X of the nozzle 540.

5-2. Operation and Effect of Valve Structure

The power storage device 1 is used in a state where the valve structure 510 is located above the housing body 70. In the case where the pressure of the internal space S1 increases to a predetermined pressure due to gas generated by the power storage device element 100, the gas passes through the first passage 520A1, the second passage 520A2 and the opening 540X and flows to the internal space 550A. The gas that flows to the internal space 550A permeates through the liquid 200 that is stored in the liquid reservoir part 570. The gas that has permeated through the liquid 200 rises through the internal space 550A and is discharged into the external space through the opening 520AY. A situation such as where the internal pressure of the internal space S1 increases excessively and the container 70A bursts is thus unlikely to occur. On the other hand, in the case where moisture infiltrates into the valve outer body 520 through the opening 520AY, infiltration of that moisture to nearer the inside of the container 70A than is the liquid reservoir part 570 is prevented by the liquid 200 that is stored in the liquid reservoir part 570. Moisture is thus kept from infiltrating into the container 70A.

5-3. Effects of Fifth Embodiment

With the valve structure 510 constituted as described above, the following effects can be further obtained.

5-3-1

The liquid reservoir part 570 is located toward the inside of the container 70A, away from the opening 520AY. The liquid 200 that is stored in the liquid reservoir part 570 thus does not readily flow outside through the opening 520AY.

5-3-2

The liquid reservoir part 570 is located in a portion partitioned by the pair of side walls 552, the nozzle 540, and the bottom wall 554. The configuration of the liquid reservoir part 270 can thus be simplified.

5-3-3

Since the nozzle 540 tapers proceeding toward the liquid reservoir part 570, that is, proceeding toward the opening 520AY, the second passage 520A2 also decreases in diameter proceeding toward the opening 520AY. The gas that has passed through the second passage 520A2 thus forms bubbles when passing through the opening 540X and easily flows into the liquid 200. Rapid permeation of the gas through the liquid 200 is thus facilitated.

6. Sixth Embodiment

In a sixth embodiment, the configuration of the valve structure 10 differs, compared to the first embodiment. Other configurations are basically similar to the first embodiment. Hereinafter, configurations that are the same as the first embodiment will be given the same reference numerals and description thereof will be omitted, with the following description focusing on the differences from the first embodiment.

6-1. Configuration of Valve Structure

Figure 9:
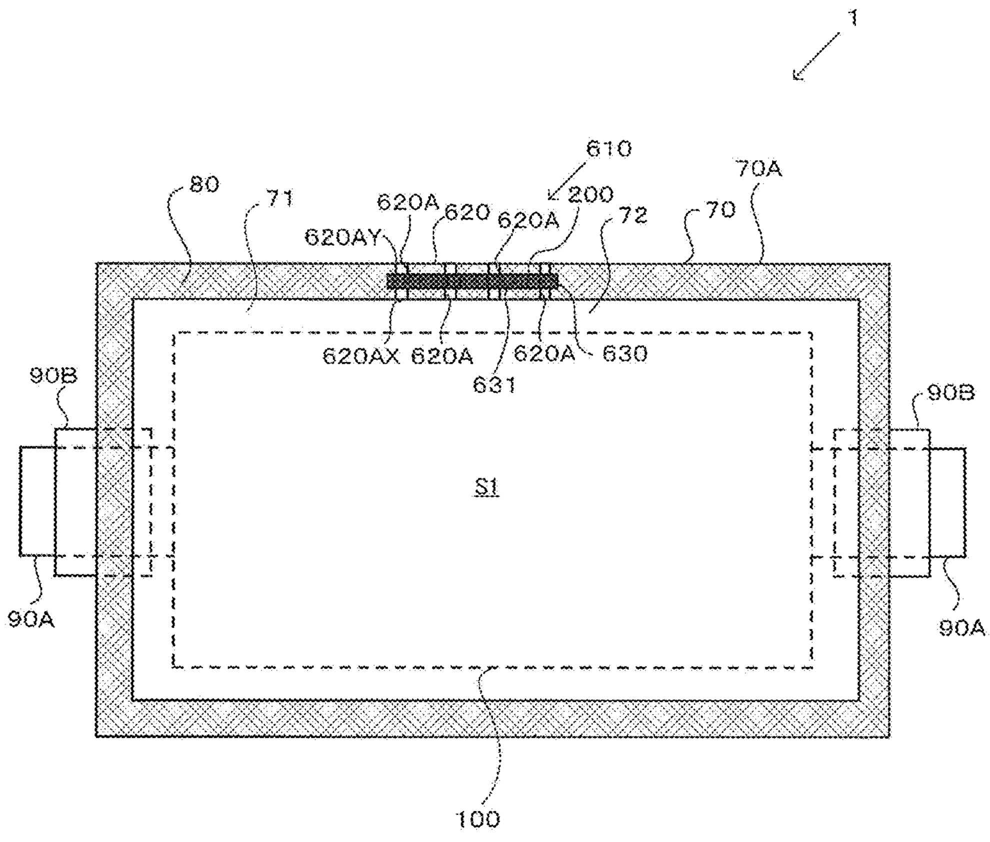
FIG. 9 is a plan view of the power storage device of a sixth embodiment.

FIG. 9 is a plan view of the power storage device 1 of the sixth embodiment. In FIG. 9, however, parts that are not originally visible from the outside are partially shown with dashed lines for reference purposes. A valve structure 610 provided in the power storage device 1 includes a pattern sealed part 620 and a liquid reservoir part 630. The pattern sealed part 620 is a portion of the peripheral sealed part 80 where the packaging material 71 and the packaging material 72 are partially not fused. The pattern sealed part 620 can be formed at any location of the peripheral sealed part 80. In the present embodiment, the pattern sealed part 620 is formed in one of the pair of long sides of the peripheral sealed part 80.

A passage 620A that communicates the inside of the container 70A with outside is formed in a portion of the pattern sealed part 620 where the packaging material 71 and the packaging material 72 are partially not heat sealed. The number of passages 620A that are formed in the pattern sealed part 620 is freely selectable. In the present embodiment, four passages 620A are formed in the pattern sealed part 620. The number of passages 620A formed in the pattern sealed part 620 may be from one to three or may be four or more. The passages 620A each have an opening 620AX facing the internal space S1 of the container 70A and an opening 620AY facing the external space.

The liquid reservoir part 630 includes a holding member 631 that is disposed so as to cross the plurality of passages 620A in the left-right direction. The holding member 631 has a similar function to the holding member 383 described in the fourth embodiment, for example. The holding member 631 is fused to the packaging material 71 and the packaging material 72, by a sealing bar that executes pattern sealing, with the holding member 631 sandwiched between the packaging material 71 and the packaging material 72. Only the portion of the holding member 631 that is located in the passage 620A thus has the function of holding the liquid 200.

6-2. Operation and Effect of Valve Structure

In the case where the pressure of the internal space S1 increases to a predetermined pressure due to gas generated by the power storage device element 100, gas flows through the opening 620AX to the passage 620A. The gas that flows through the passage 620A permeates through the liquid 200 that is held in the holding member 631 and is discharged into the external space through the opening 620AY. A situation such as where the internal pressure of the internal space S1 increases excessively and the container 70A bursts is thus unlikely to occur. On the other hand, in the case where moisture infiltrates into the passage 620A through the opening 620AY, infiltration of that moisture to nearer the inside of the container 70A than is the liquid reservoir part 630 is prevented by the liquid 200 that is stored in the liquid reservoir part 630. Moisture is thus kept from infiltrating into the container 70A.

6-3. Effects of Sixth Embodiment

With the valve structure 610 constituted as described above, the following effect can be further obtained.

6-3-1

Since the valve structure 610 is located within the contour of the container 70A, the size of the power storage device 1 can be miniaturized.

7. Seventh Embodiment

In a seventh embodiment, the configuration of the valve structure 10 differs, compared to the first embodiment. Other configurations are basically similar to the first embodiment. Hereinafter, configurations that are the same as the first embodiment will be given the same reference numerals and description thereof will be omitted, with the following description focusing on the differences from the first embodiment.

7-1. Configuration of Valve Structure

Figure 10:
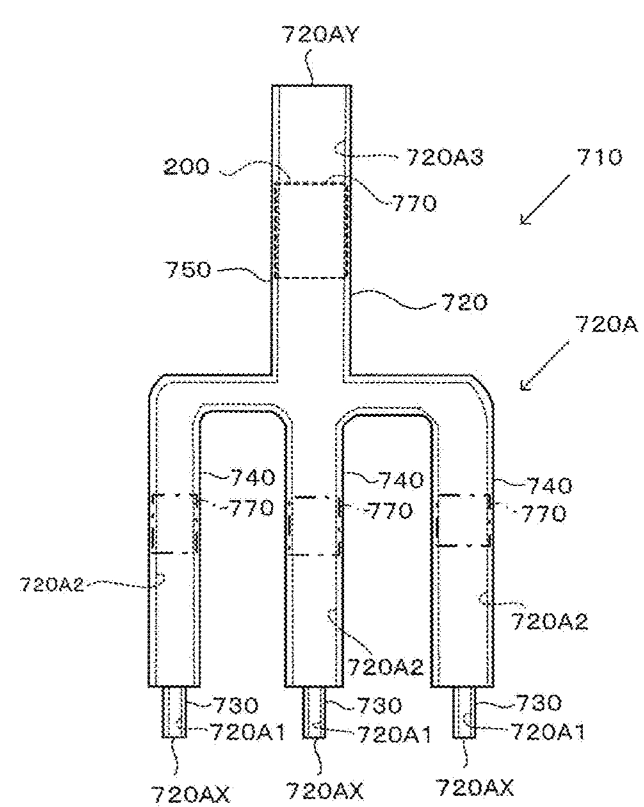
FIG. 10 is a front view of the valve structure of a seventh embodiment.

FIG. 10 is a front view of a valve structure 710 of the seventh embodiment. In FIG. 10, however, parts that are not originally visible from the outside are partially shown with dashed lines for reference purposes. The valve structure 710 is configured to be attachable to a plurality of containers 70A. The valve structure 710 includes a valve outer body 720 inside which a passage 720A is formed, and a liquid reservoir part 770 located inside the passage 720A. Note that, in the present embodiment, similarly to the first embodiment, at least one of the check valve 40 and the membrane filter 50 can also be disposed in the passage 720A, further toward the inside of the container 70A than is the liquid reservoir part 770.

The material constituting the valve outer body 720 is freely selectable. The material constituting the valve outer body 720 is preferably a material having excellent flexibility, so as to be able to deform according to the disposition of the plurality of containers 70A. An example of a material with excellent flexibility is a synthetic resin having flexibility. Examples of synthetic resins having flexibility include olefin resin, polyester resin, acrylic resin, urethane resin, fluororesin, and synthetic rubber. Note that the material constituting the valve outer body 720 may be only a synthetic resin, or may be a composite material with a metal in order to have provide barrier properties. For example, an aluminum foil may be laminated on the synthetic resin, or a thin film of aluminum oxide or another oxide may be layered on the synthetic resin. Furthermore, portions of the valve outer body 720 or the like that bend during use require flexibility, and thus may be constituted by a synthetic resin, while straight portions or the like that do not bend during use may be constituted by a metal having high rigidity. In other words, the valve outer body 720 may be configured by combining components made of a synthetic resin material and components made of a metal material.

The passage 720A that is formed inside the valve outer body 720 is a passage that communicates the inside of the container 70A (see FIG. 1) with outside. The passage 720A has an opening 720AX facing the internal space S1 of the container 70A and an opening 720AY facing the external space. The valve outer body 720 has an attachment part 730, a plurality of branch parts 740, and a merging part 750.

The attachment part 730 is a part for attaching the valve structure 710 to the container 70A, and has a substantively similar configuration and function to the attachment part 21 of the first embodiment. A first passage 720A1 is formed inside the attachment part 730.

The plurality of branch parts 740 are generally cylindrical, and a second passage 720A2 is formed therein. The branch parts 740 may be integrally formed with the attachment part 730 or may be formed separately. The number of branch parts 740 included in the valve structure 710 is freely selectable, as long as there are two or more. In the present embodiment, the valve structure 710 has three branch parts 740. The second passages 720A2 communicate with the first passages 720A1. The maximum diameter of the second passage 720A2 is larger than the maximum diameter of the first passage 720A1. The plurality of branch parts 740 are respectively attached to different containers 70A, via the attachment part 730.

The merging part 750 is generally cylindrical, and a third passage 720A3 is formed therein. The third passage 720A3 is a passage that communicates with the second passages 720A2 and is where the second passages 720A2 that are formed in the plurality of branch parts 740 merge.

The liquid reservoir part 770 is located inside at least one of the third passage 720A3 and the second passages 720A2. In the present embodiment, the liquid reservoir part 770 is located in the third passage 720A3. The configurations illustrated in the first to fifth embodiments, for example, can be employed as the specific configuration of the liquid reservoir part 770. In the case where the reservoir 770 is located in the second passages 720A2, as shown with the one-dot chain lines in FIG. 10, the configuration illustrated in the third or fourth embodiment, for example, can be employed as the specific configuration thereof.

7-2. Operation and Effect of Valve Structure

The power storage device 1 is used in a state where the valve structure 710 is located above the housing body 70. In the case where the pressure of the internal spaces S1 increases to a predetermined pressure due to gas generated by the power storage device elements 100, gas flows through the openings 720AX to the first passages 720A1. The gas that flows to the first passages 720A1 flows to the second passages 720A2 and merges in the third passage 720A3. The gas that merges in the third passage 720A3 permeates through the liquid 200 that is stored in the liquid reservoir part 770. The gas that has permeated through the liquid 200 rises through the third passage 720A3 and is discharged into the external space through the opening 720AY. A situation such as where the internal pressure of the internal spaces S1 increases excessively and the containers 70A burst is thus unlikely to occur. On the other hand, in the case where moisture infiltrates into the valve outer body 720 through the opening 720AY, infiltration of that moisture to nearer the inside of the containers 70A than is the liquid reservoir part 770 is prevented by the liquid 200 that is stored in the liquid reservoir part 770. Moisture is thus kept from infiltrating into the containers 70A.

7-3. Effects of Seventh Embodiment

With the valve structure 710 constituted as described above, the following effect can be further obtained.

7-3-1

Since the valve structure 710 has the plurality of branch parts 740, gas generated by the power storage device elements 100 that are housed in the plurality of containers 70A can be discharged to the outside. Convenience is thus enhanced.

8. Variations

The above embodiments are illustrative examples of forms that can be taken by the valve structure and power storage device relating to the present invention and are not intended to restrict the forms thereof. The valve structure and power storage device relating to the present invention can take different forms from the forms illustrated in the embodiments. One example is a form in which some of the configurations of the embodiments are replaced, modified or omitted, or a form in which configurations are newly added to the embodiments. A number of examples of variations of the embodiments will be shown below.

8-1

The configuration of the valve structure 10 is not limited to that shown in the first embodiment, and can be freely modified. For example, the liquid reservoir part 30 of the valve structure 10 can also be located inside the container 70A. In this case, for example, the liquid reservoir part 30 is located in the first passage 20A1. Note that this variation can also be similarly applied to the second to fifth embodiments and the seventh embodiment.

8-2

In the first embodiment, the connection part 22 of the valve outer body 20 can also be omitted. In this case, the attachment part 21 is connected to the tubular part 23, or the attachment part 21 and the tubular part 23 are integrally formed.

8-3

In the first to fifth embodiments and the seventh embodiment, at least one of the check valve 40 and the membrane filter 50 may be omitted. Note that, in the first embodiment, the membrane filter 50 needs to be disposed further toward the inside of the container 70A (power storage device element 100 side) than is the liquid reservoir part 30. In the case where the check valve 40 is disposed further toward the inside of the container 70A than is the liquid reservoir part 30, the membrane filter 50 is preferably disposed even further toward the inside of the container 70A than is the check valve 40. This also similarly applies to the second to fifth embodiments and the seventh embodiment.

8-4

In the third and fourth embodiments, the second partitioning member 382 of the liquid reservoir part 370 can also be omitted.

8-5

In the first to seventh embodiments, the container 70A is constituted by the packaging material 71 and the packaging material 72 being heat sealed, but the container 70A may also be constituted by folding one sheet of packaging material and heat sealing the peripheral portion thereof.

8-6

In the first embodiment, the tubular part 23 may have any cross-sectional shape such as a polygonal shape or an elliptical shape. This similarly applies to the tubular part 240 of the second embodiment, the tubular part 340 of the third and fourth embodiments, the attachment part 530 of the fifth embodiment, and the branch parts 740 and the merging part 750 of the seventh embodiment.

REFERENCE SIGNS LIST

1 Power storage device
10 Valve structure
20 Valve outer body
20A Passage
20AY Opening
21 Attachment part
23 Tubular part
23B Second curved part (curved part)
30 Liquid reservoir part
40 Check valve
70 Housing body
70A Container
71 Packaging material
72 Packaging material
100 Power storage device element
200 Liquid
210 Valve structure
220 Valve outer body
220A Passage
220AY opening
230 Attachment part
240 Tubular part
270 Liquid reservoir part
310 Valve structure
320 Valve outer body
320A Passage
320AY Opening
330 Attachment part
383 Holding member
340 Tubular part
370 Liquid reservoir part
410 Valve structure
510 Valve structure

520 Valve outer body
520A Passage
520AY Opening
530 Attachment part
570 Liquid reservoir part
610 Valve structure
620 Pattern sealed part
620A Passage
620AY Opening
630 Liquid reservoir part
710 Valve structure
720 Valve outer body
720A Passage
720AY Opening
730 Attachment part
770 Liquid reservoir part

The invention claimed is:

1. A valve structure comprising:

a passage communicating an inside of a container housing a power storage device element with outside;

a liquid reservoir part located inside the passage and storing a liquid through which gas generated by the power storage device element is permeable; and a check valve disposed toward an inside of the container relative to the liquid reservoir part, and configured to open when an internal pressure of the container increases due to the gas generated inside the container, and pass the gas toward the outside from nearer the inside of the container.

2. The valve structure according to claim 1, wherein the passage includes an opening that discharges the gas to outside the container, and the liquid reservoir part is located toward the inside of the container, away from the opening.

3. The valve structure according to claim 1, comprising:

a valve outer body inside which the passage is formed, wherein the valve outer body includes an attachment part configured to be fixed to the container.

4. The valve structure according to claim 3, wherein the valve outer body further includes a tubular part joined to the attachment part and disposed outside the container, the tubular part includes a curved portion, and the liquid reservoir part is located in the curved portion.

5. The valve structure according to claim 3, wherein the valve outer body further includes a tubular part joined to the attachment part and a casing into which the tubular part is inserted, and the liquid reservoir part is located inside the casing.

6. The valve structure according to claim 3, wherein the liquid reservoir part further includes a partitioning member supported by the valve outer body and partitioning a housing space housing the liquid inside the passage.

7. The valve structure according to claim 6, wherein the liquid reservoir part includes a holding member supported by at least one of the valve outer body and the partitioning member and configured to hold the liquid, and a material constituting the holding member includes a porous material.

8. The valve structure according to claim 3, wherein the valve outer body further includes a nozzle joined to the attachment part and tapered proceeding toward the liquid reservoir part.

9. The valve structure according to claim 1, wherein a melting point of the liquid is 0° C. or lower.

10. The valve structure according to claim 1, wherein a boiling point of the liquid is 150° C. or higher.

11. The valve structure according to claim 2, comprising:

a valve outer body inside which the passage is formed, wherein the valve outer body includes an attachment part configured to be fixed to the container.

12. The valve structure according to claim 4, wherein the liquid reservoir part further includes a partitioning member supported by the valve outer body and partitioning a housing space housing the liquid inside the passage.

13. A power storage device comprising:

the valve structure according to claim 1; and an internal space demarcated by the container and housing the power storage device element.

14. The power storage device according to claim 13, wherein the container includes a packaging material and a sealed part in which the packaging material is partially fused such that a housing space housing the power storage device element is formed, and the passage is formed in a portion of the sealed part where the packaging material is not fused.

* * * * *